United States Patent
Calonge et al.

(10) Patent No.: US 7,475,910 B1
(45) Date of Patent: Jan. 13, 2009

(54) CONTAINER HAVING INTERNAL BULKHEAD

(75) Inventors: Joe Calonge, Athens, TN (US); Travis S. McCloud, Athens, TN (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 11/113,284

(22) Filed: Apr. 25, 2005

(51) Int. Cl.
*B60P 3/22* (2006.01)
(52) U.S. Cl. .................. 280/839; 280/837; 280/830
(58) Field of Classification Search ............. 280/838, 280/830, 837, 839, 831, 832, 834; 220/564, 220/562, DIG. 24
See application file for complete search history.

(56) References Cited

U.S. PATENT DOCUMENTS

| | | | | | |
|---|---|---|---|---|---|
| RE19,472 | E | * | 2/1935 | Thwaits | 280/838 |
| 2,006,669 | A | * | 7/1935 | Clay | 280/838 |
| 2,008,858 | A | * | 7/1935 | Thwaits et al. | 280/838 |
| 2,026,501 | A | * | 12/1935 | Jensen | 220/564 |
| 2,065,268 | A | * | 12/1936 | Crary | 280/838 |
| 2,067,994 | A | * | 1/1937 | Thwaits | 280/838 |
| 2,074,523 | A | * | 3/1937 | Thwaits | 280/838 |
| 2,078,939 | A | * | 5/1937 | Ferguson | 280/838 |
| 2,114,822 | A | * | 4/1938 | Thwaits | 280/838 |
| 2,239,507 | A | * | 4/1941 | Firth | 280/838 |
| 2,632,577 | A | * | 3/1953 | Sacco | 220/564 |
| 2,784,747 | A | * | 3/1957 | Weempe | 280/838 |
| 3,148,786 | A | * | 9/1964 | Boeck et al. | 280/838 |
| 3,631,815 | A | * | 1/1972 | Heap et al. | 280/830 |
| 4,325,560 | A | * | 4/1982 | Hirvonen | 280/838 |
| 4,789,170 | A | * | 12/1988 | Reber | 280/838 |
| 5,630,625 | A | * | 5/1997 | Shaw | 280/838 |
| 5,755,264 | A | * | 5/1998 | Richards et al. | 280/830 |

* cited by examiner

*Primary Examiner*—Hau V Phan
(74) *Attorney, Agent, or Firm*—Chambliss, Bahner & Stophel, P.C.

(57) ABSTRACT

A container assembly for a container trailer includes a generally cylindrical elongate container with a bulkhead mounted internally within the container. The bulkhead comprises a non-flanged curved plate having a curve of constant radius, and it includes a horizontally-oriented stiffening rib. The trailer also includes a structural frame which supports all or a portion of the container, a plurality of axles and a suspension system.

14 Claims, 10 Drawing Sheets

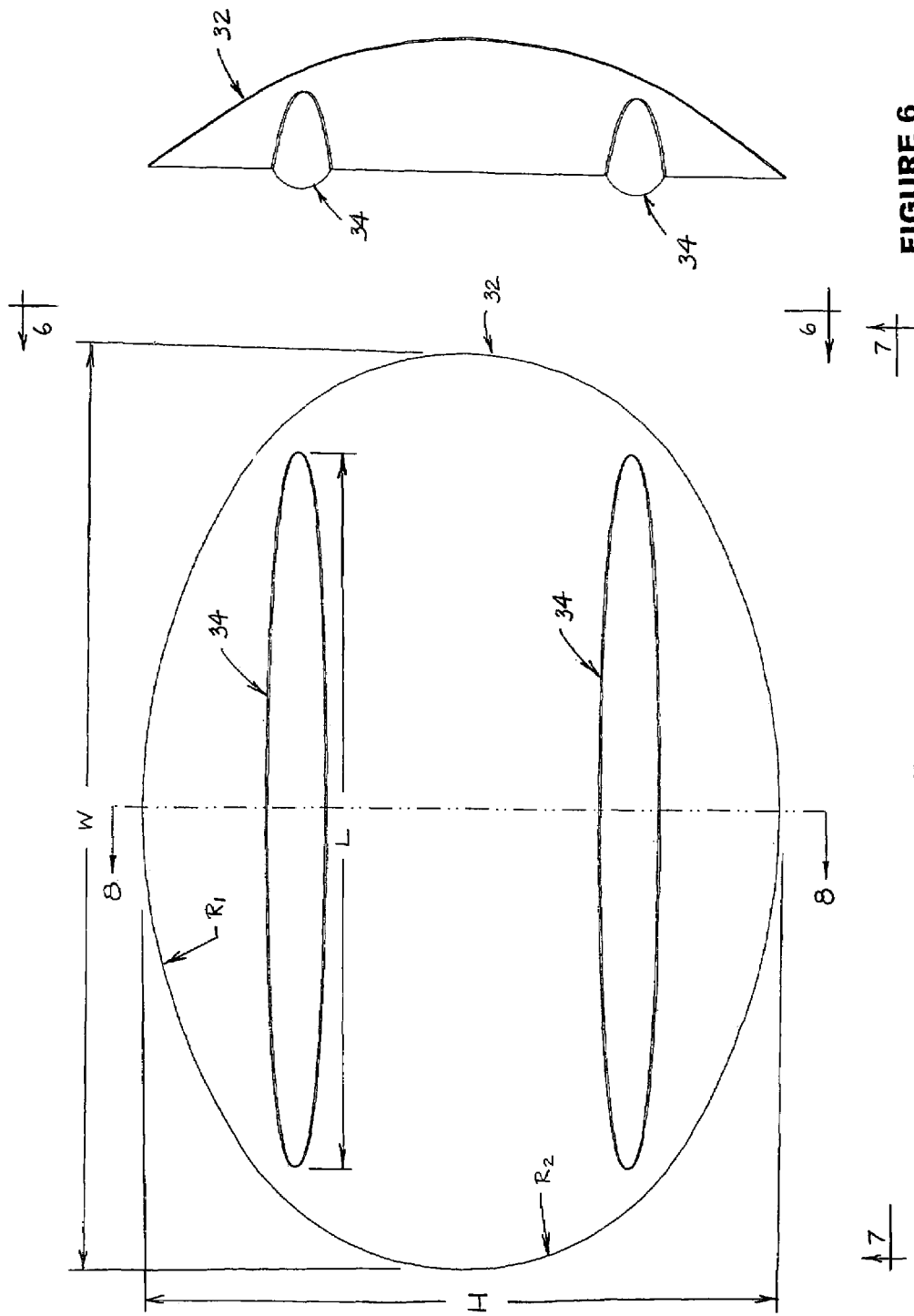

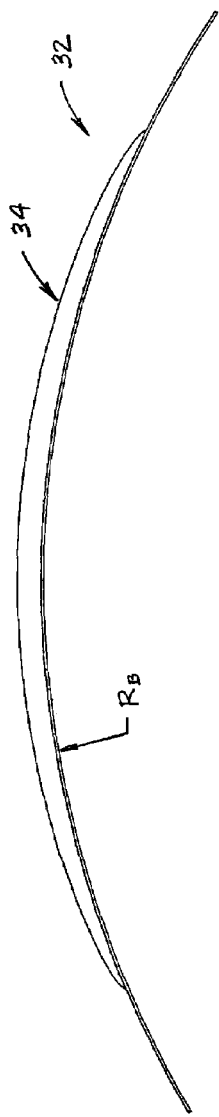
FIGURE 7
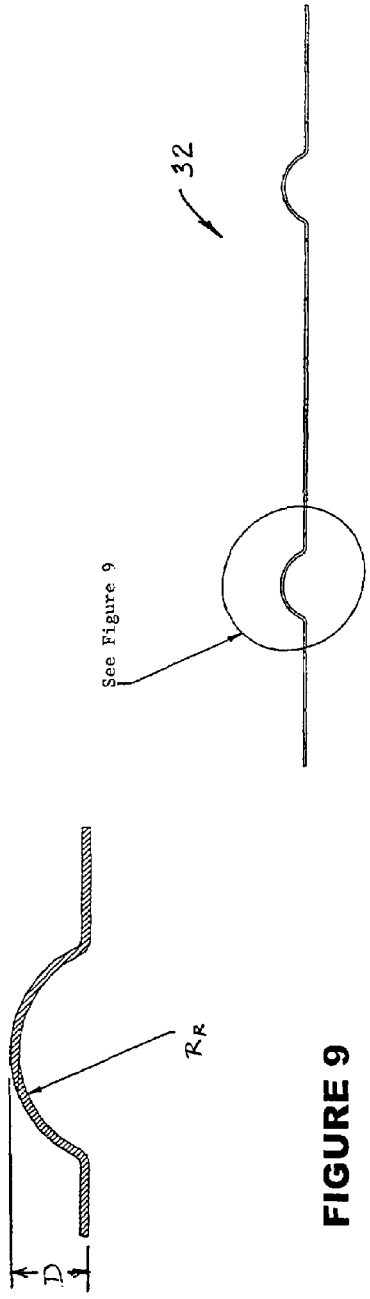
FIGURE 8
FIGURE 9

CONTAINER HAVING INTERNAL BULKHEAD

FIELD OF THE INVENTION

This invention relates generally to the fabrication and assembly of a container having one or more internal bulkheads. A preferred embodiment of the invention relates to a container that is mounted on a trailer or vehicle and is adapted to transport liquid or other fluent materials.

BACKGROUND AND DESCRIPTION OF THE PRIOR ART

Many liquid or other fluent materials are conveniently transported by truck, although they may also be transported by railcar, barge or by other means. Trucks that are used to transport such materials may include a frame on which a container is mounted, or they may comprise a tractor and an attached trailer having a container mounted thereon. Gasoline and other petroleum products are often transported by a tractor and an attached trailer to which a generally-cylindrical container is mounted. The support frame for a container trailer (or for a truck on which a container is mounted) typically includes a base frame which supports the container and a suspension frame which includes the wheel/axle assembly and the suspension system. Container trailers which travel on interstate highways in the United States are required to have a circumferential supports for the container that are spaced no more than 60 inches apart along the length of the container. Since such containers are often used to haul more than one product, such as gasoline products of different grade, at the same time, they are commonly provided with internal bulkheads to separate product compartments within the container. These internal bulkheads may be located so as to provide the necessary circumferential reinforcement for the structure of the assembly.

Typically, the container is fabricated in one assembly and the base frame and suspension frame are fabricated in another assembly. In most circumstances, all three components, the container, the base frame and the suspension frame are separately fabricated and the two frame components are welded or bolted together prior to mounting of the container thereon. Conventionally, the body of the container is assembled from four components, a top component, a bottom component and two side components, to comprise a generally cylindrical enclosure. The four components, which are not usually of the same thickness, are generally comprised of sheet aluminum or similar material that is rolled or otherwise formed so that when assembled, the components comprise a generally cylindrical structure. In conventional construction for a container that is adapted to be mounted on a truck or trailer, the bottom and two side components are welded together to form a generally U-shaped structure, the bulkheads are then welded into place, and the top component is then welded to the side components and to the bulkhead. Then an end cap is welded to each end of the generally cylindrical enclosure to complete the assembly.

Because the various product compartments of a truck or trailer mounted container are unloaded at different times, conventional bulkheads are generally comprised of a flanged dish to permit them to withstand the pressures exerted on one side or the other. These flanged dish bulkheads are themselves fabricated in a process involving several steps. Generally a blank is cut from a sheet of aluminum or other metal, and a press (such as a vacuum forming press) is employed to form the blank into a dome-shaped or dish-shaped structure. Then a flange is formed around the periphery of the domed structure, which flange is adapted to adjoin the interior surface of the container. In some cases, a vacuum forming press or other press can be used to form the blank directly into a flanged dish. In most cases, however, the flanged edge must be separately formed and then trimmed. Frequently, reinforcing ribs must also be fabricated and welded to the flanged dish. The flanged dish is then welded by human welders to the adjoining interior surface of the partially formed container. When all of the flanged dish bulkheads are installed in the partially completed container, the top component of the container is welded to the two side components and to the flanged dish bulkhead.

A fabrication process requiring so many steps and components is generally not suitable for robot welding. It is common, therefore, for all of the welds in such a process to be made by human welders instead of robot welders. Consequently, the conventional process for fabricating and assembling a container is slow, labor-intensive and expensive. In addition, such a process is susceptible to errors of fit of the various components with respect to each other. Furthermore, in an attempt to correct errors in fit between the components, large welds are often made to fill in the gaps between components. Such large welds may contribute increased weight and may cause heat distortion in the finished container.

It would be desirable if a manufacturing method and design for a container having bulkheads could be devised that would reduce or minimize the number and complexity of the steps required for fabrication and assembly. It would also be desirable if such a method and design could be devised that would reduce or minimize the risk of human error in the assembly process. It would also be desirable if such a method and design could be provided that would provide for more accurate fit of the various components, thus reducing the size of the welds required and reducing the effects of heat distortion due to such welds. It would also be desirable if such a method and design could be developed that would require fewer and less complex components than conventional designs.

ADVANTAGES OF THE INVENTION

Among the advantages of the invention is that it permits the assembly of a container having bulkheads utilizing fewer and/or less complex components than are required by conventional methods and container designs. Another advantage of the invention is that it provides for manufacture of a container having bulkheads more quickly and with more accurate fit than is obtained by conventional methods and container designs. Still another advantage of the invention is that it is susceptible to a larger number of welds being provided by robot welders than in conventional methods and designs. Another advantage of the invention is that it provides an assembly method for such a container that requires fewer steps than conventional methods.

Additional advantages of this invention will become apparent from an examination of the drawings and the ensuing description.

EXPLANATION OF TECHNICAL TERMS

As used herein, the term "container" refers to a tank or enclosure for liquids or other fluent materials that may be mounted on a trailer and pulled by a tractor or mounted on the frame of a truck.

As used herein, the term "container vehicle" refers to a truck having a frame on which a container is mounted or a trailer on which a container is mounted.

As used herein, the term "container trailer" and similar terms refer to a trailer which is adapted to haul liquids or other fluent materials and which is adapted to be pulled by a tractor.

As used herein, the term "frame assembly" and similar terms refer to the structural frame that supports all or a portion of the container that is mounted on a truck or trailer and which may carry the axles and suspension system of the truck or trailer.

As used herein, the term "generally cylindrical" refers to an elongated enclosure having a cross-section that is cylindrical, elliptical or polygonal, or is comprised of a combination of one or more straight sections and one or more arcs of constant radius or one or more arcs of varying radius.

As used herein, the term "generally elliptical" refers to a closed curve that is symmetrical about a horizontal and a vertical axis, said curve having a major radius and a minor radius.

As used herein, the term "non-flanged plate" refers to a plate which may be curved, but which does not include a peripheral flange that is adapted to adjoin the interior surface of a container. A "non-flanged plate" may include a peripheral edge that is adapted to abut the interior surface of a container.

SUMMARY OF THE INVENTION

The invention comprises a container assembly, a container trailer and a method for assembling a generally cylindrical container for a container vehicle. The method includes providing a curved bottom component for the container, providing a curved top component for the container and providing a pair of curved side components for the container, wherein each of the side components includes an upper edge and a lower edge. The bottom component, top component and side components are sized, curved and arranged so that the lower edges of the side components may be attached to the bottom component and the upper edges of the side components may be attached to the top component to form a generally cylindrical enclosure. A pair of end caps for the generally cylindrical enclosure are provided, and the bottom component, top component and two side components are assembled to form a generally cylindrical enclosure. A sheet is provided for fabrication of a bulkhead, and a bulkhead blank is cut from the sheet. A bulkhead is formed comprising a curved non-flanged plate from the bulkhead blank, and a stiffening rib is formed in the bulkhead. The bulkhead is attached inside the generally cylindrical enclosure so that the stiffening rib is horizontally oriented, and the end caps are attached to each end of the generally cylindrical enclosure to form a container.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 5 is a front view of a bulkhead formed according to a preferred embodiment of the invention.

FIG. 6 is an end view of the bulkhead of FIG. 5, taken along line 6-6 of FIG. 5.

FIG. 7 is a side view of the bulkhead of FIGS. 5 and 6, taken along line 7-7 of FIG. 5.

FIG. 8 is a sectional view of the bulkhead of FIGS. 5-7, taken along line 8-8 of FIG. 5.

FIG. 9 is a detailed view of a portion of the bulkhead of FIG. 8.

DESCRIPTION OF THE PREFERRED EMBODIMENTS OF THE INVENTION

Figure 1:
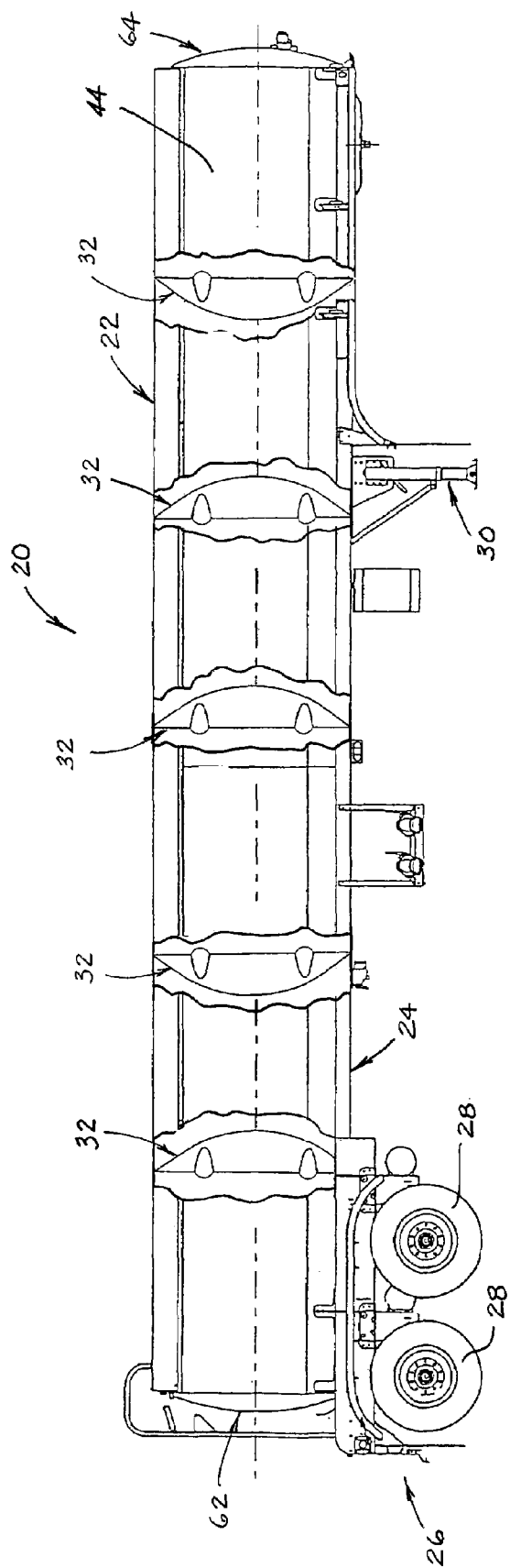
FIG. 1 is a side view, partially broken away, a container trailer that includes a preferred embodiment of the container assembly of the invention.

As described above, trucks that are used to transport liquid and other fluent materials, such as, for example, gasoline and other petroleum products, may comprise a tractor (not shown in the drawings) and an attached container trailer such as is shown in FIG. 1. Container trailer 20 comprises container 22, base frame 24 which supports the container and suspension frame 26 which includes wheels 28 and associated axles, trailer support 30, and which may include other components such as air tanks for supplying air for the trailer (not shown), and springs or air bags (also not shown) to cushion the ride. Container 22 also includes a plurality of internal bulkheads 32 which are formed according to a preferred embodiment of the invention. These internal bulkheads separate product compartments within container 22 and are preferably located so as to provide the necessary circumferential reinforcement for the structure of the container assembly.

Figure 3:
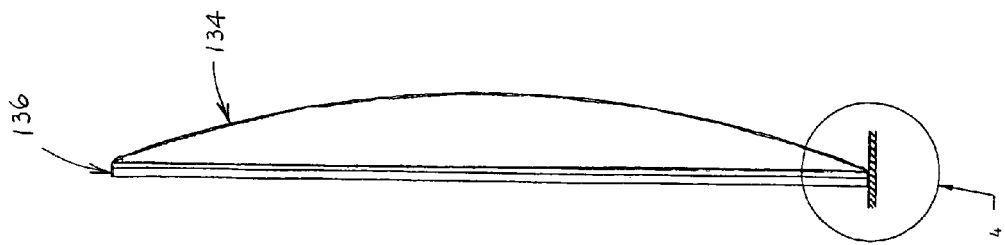
FIG. 3 is a side view of the conventional bulkhead of FIG. 2, showing a portion of its abutment with the interior of a container assembly.
Figure 2:
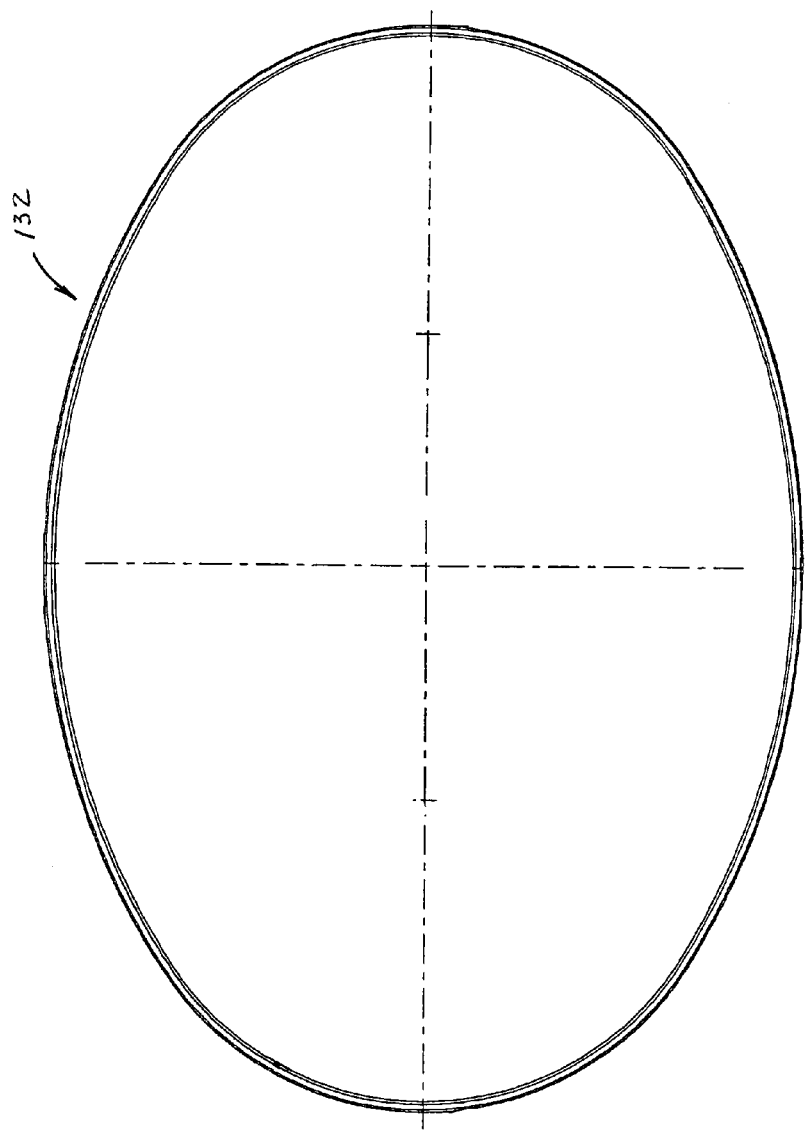
FIG. 2 is a front view of a conventional bulkhead that has been used in connection with a container trailer similar to that shown in FIG. 1.
Figure 4:
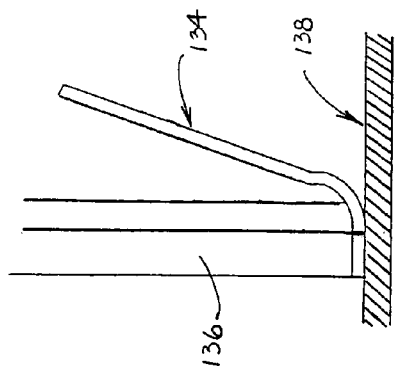
FIG. 4 is a detailed view of a portion of the conventional bulkhead of FIG. 3.

A conventional bulkhead design is shown in FIGS. 2-4. As shown therein, bulkhead 132 comprises dome-shaped or dish-shaped section 134 and flange 136 which is formed around the periphery of the domed section. The flange is adapted to adjoin interior surface 138 of a container (not shown). Conventional bulkheads of this type are generally fabricated in a process involving several steps. First, a blank is cut from a sheet of aluminum or other metal, and a press (such as a vacuum forming press) is employed to form the blank into a dome-shaped or dish-shaped structure. Then the flange is formed around the periphery of the domed structure in a separate operation, although in some cases, a vacuum forming press or other press can be used to form the blank directly into a flanged dish. In most cases, however, the flanged edge must be separately formed and then trimmed. Frequently (although not shown in FIGS. 2-4), reinforcing ribs must also be fabricated and welded to the flanged dish. The flanged dish is then welded by human welders to the adjoining interior surface of a partially formed container.

Figure 10:
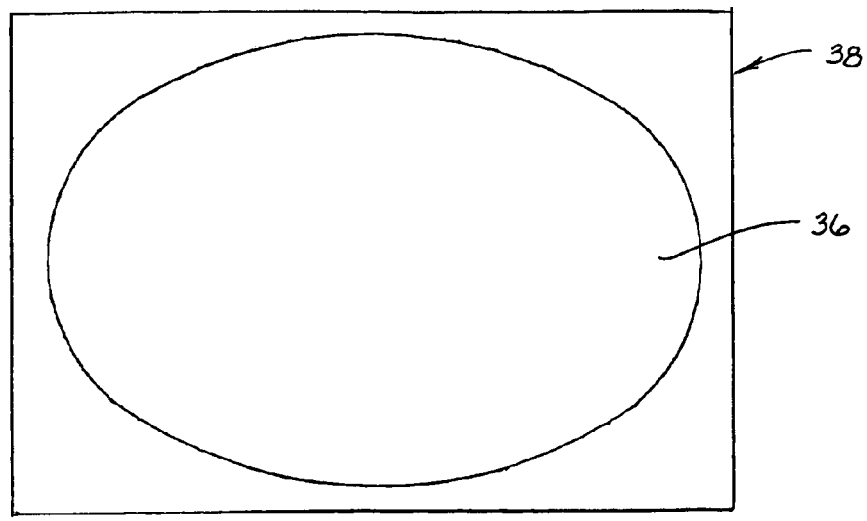
FIG. 10 is a top view of a sheet of material from which a bulkhead blank may be cut.

A preferred embodiment of a bulkhead formed according to the invention is illustrated in FIGS. 5-9. As shown therein, bulkhead 32 comprises a curved non-flanged plate, preferably having a curve of constant radius $R_B$ (see FIG. 7). Preferred bulkhead 32 also includes a pair of stiffening ribs 34 formed therein. Preferably, as shown in FIG. 10, bulkhead blank 36 is cut from a sheet such as sheet 38 of aluminum or similar material, and the bulkhead is then formed from the blank by a vacuum forming press or similar means as are known to those having ordinary skill in the art to which the invention relates. In an especially preferred embodiment of the method, the bulkhead blank is stamped on a double acting stamping press to form the curve of constant radius, as well as the stiffening ribs. Otherwise, the stiffening ribs are formed by a separate operation. As shown in the drawings, the stiffening ribs are formed so as to project from the convex side of the bulkhead, although the ribs could alternatively project from the concave side.

Referring again to FIG. 5, preferred bulkhead 32 has width W and height H. Preferably, the radius of curvature $R_B$ is within the range of 80-100% of width W. Most preferably, the radius of the curve of the bulkhead is within the range of 90-95% of the width of the bulkhead. It is also preferred that the bulkhead be provided in a generally elliptical shape having a major radius $R_1$ and a minor radius $R_2$ (also shown in FIG. 5). Preferably, the bulkhead is formed so that the minor radius $R_2$ is within the range of 30-50% of the major radius $R_1$, and most preferably, the minor radius $R_2$ is about 40% of the major radius $R_1$. Also as shown in FIGS. 5 and 9, preferred rib 34 has a length L, a depth D and a radius $R_R$ at the center of its length that is within the range of 1-2 times its depth D at the center of its length. Most preferably, radius $R_R$ at the center of the horizontally-oriented stiffening rib is about 1.5 times the depth D of the horizontally-oriented stiffening rib at the center of its length.

Figure 11:
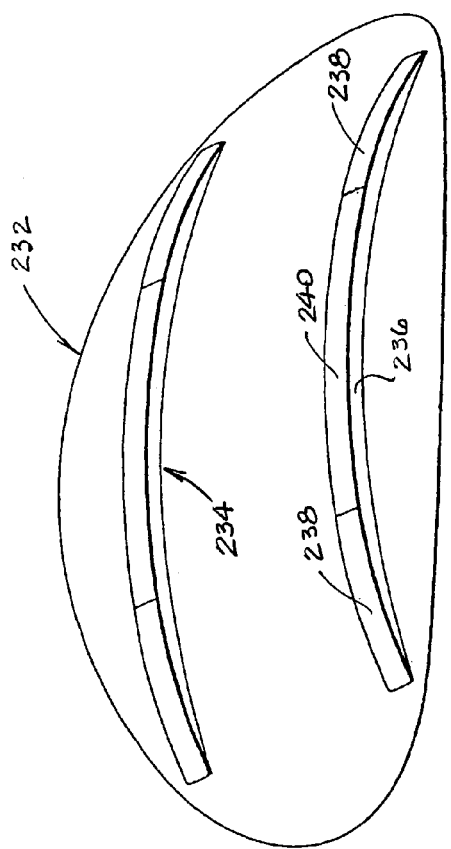
FIG. 11 is a perspective view of an alternative embodiment of a bulkhead formed according to the invention.

FIG. 11 illustrates an alternative embodiment of the bulkhead. As shown therein, bulkhead 232 is comprised of a curved plate, preferably having a curve of constant radius, to which a pair of stiffening ribs 234 have been attached. Ribs 234 are comprised of a pair of side pieces (one of which, side piece 236 is shown), a pair of end pieces 238 and a top piece 240. Preferably, these components of rib 234 are cut and formed and welded onto bulkhead 232. Although ribs 234 are shown in FIG. 11 as projecting from the convex side of bulkhead 232, they could alternatively project from the concave side.

Figure 13:
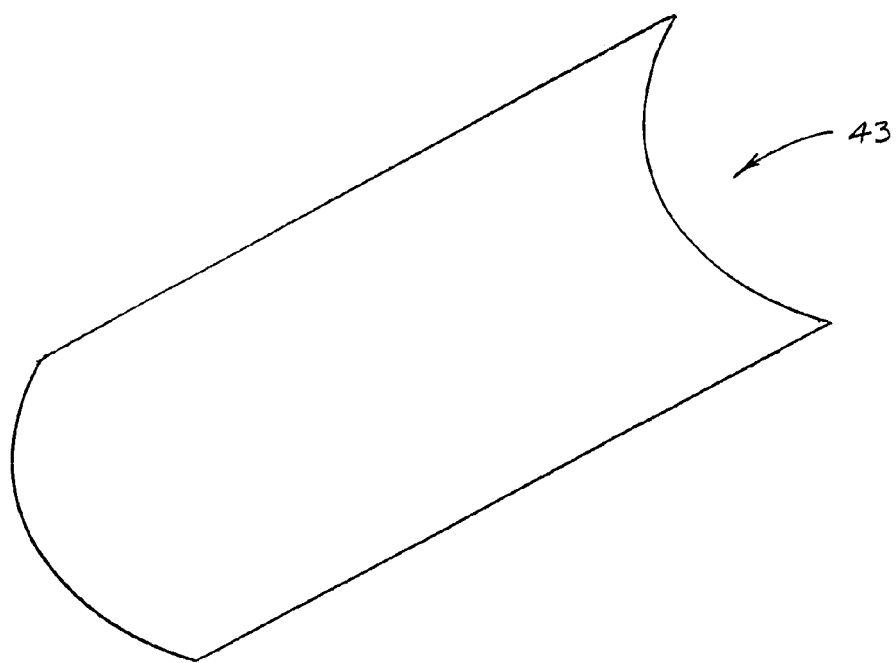
FIG. 13 is a perspective view of a curved plate that may comprise one of the side components of a container.
Figure 14:
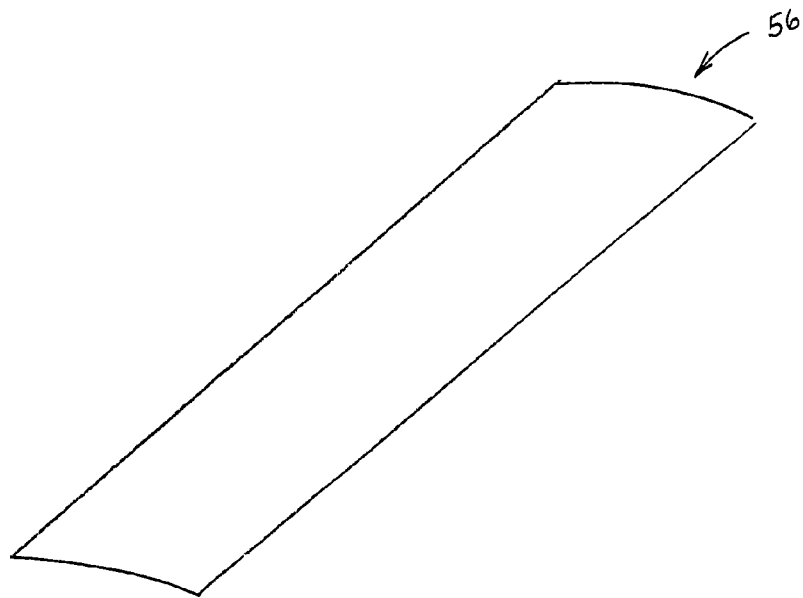
FIG. 14 is a perspective view of a curved plate that may comprise the top component of a container.
Figure 12:
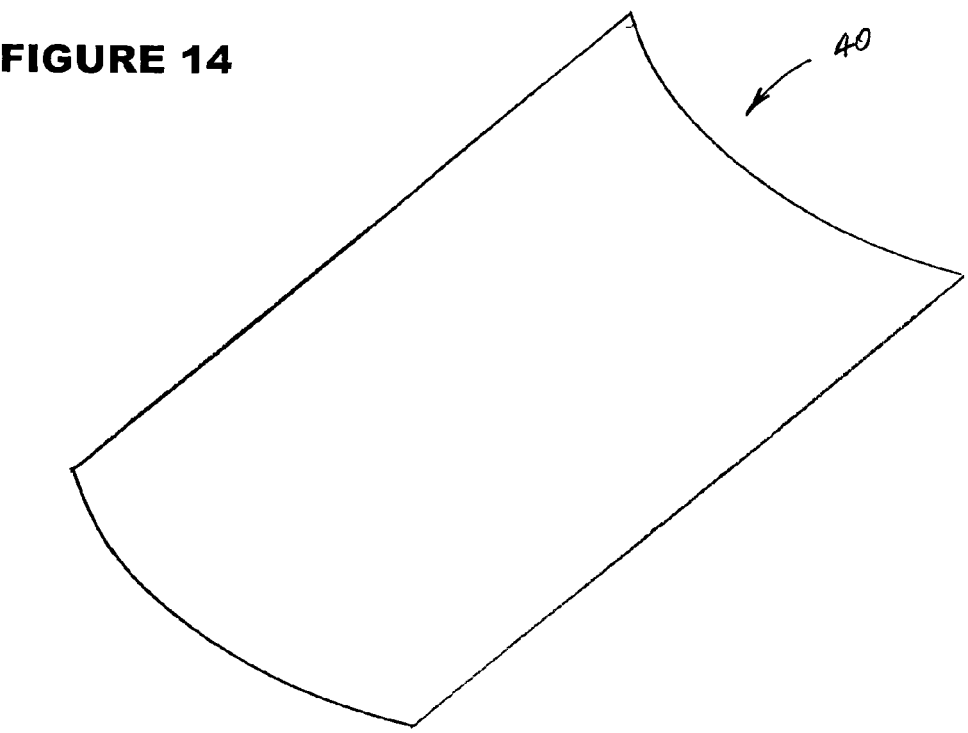
FIG. 12 is a perspective view of a curved plate that may comprise the bottom component of a container.
Figure 15:
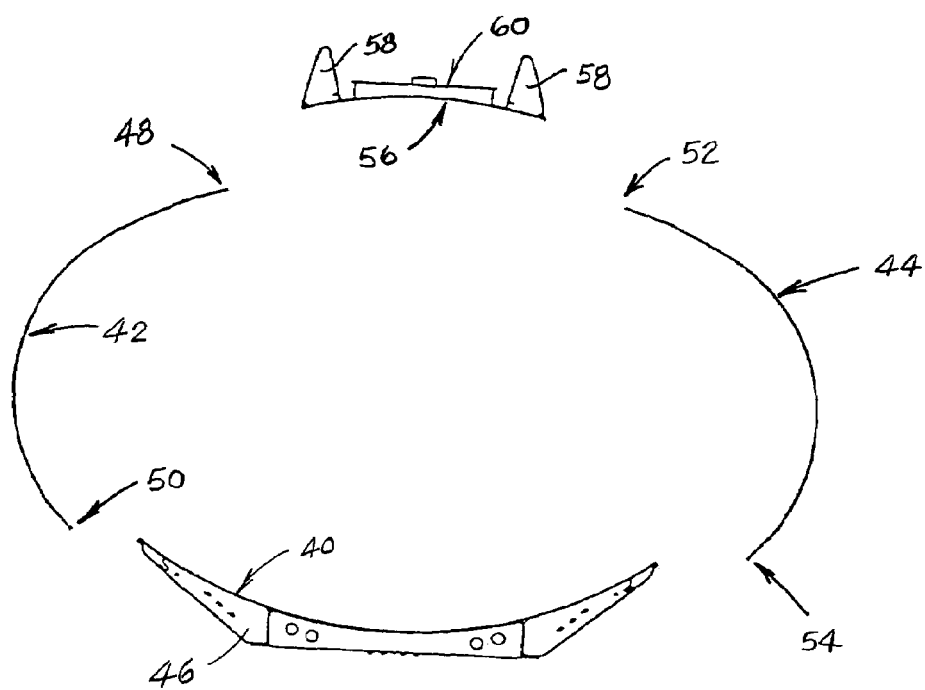
FIG. 15 is a schematic view showing a first step in a preferred method for assembling a container for a container vehicle according to the invention.
Figure 16:
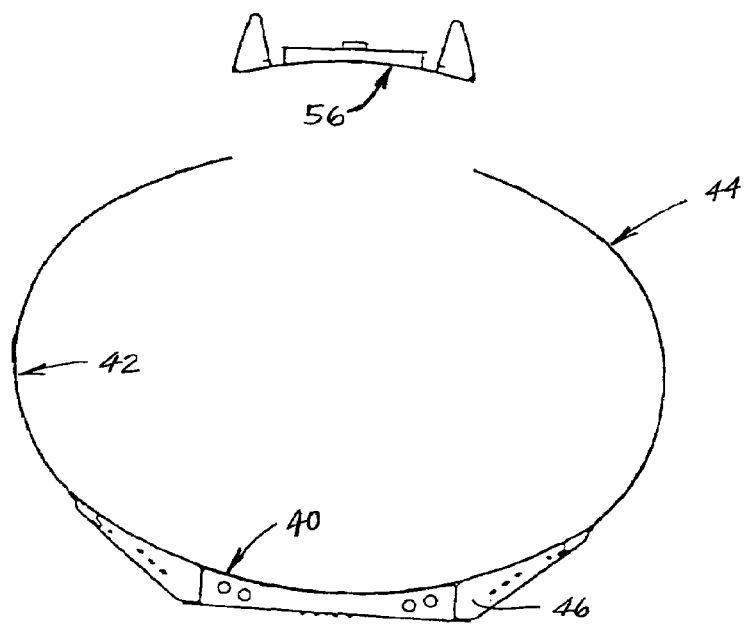
FIG. 16 is a schematic view showing a subsequent step (to that shown in FIG. 15) in a preferred method for assembling a container for a container vehicle according to the invention.
Figure 17:
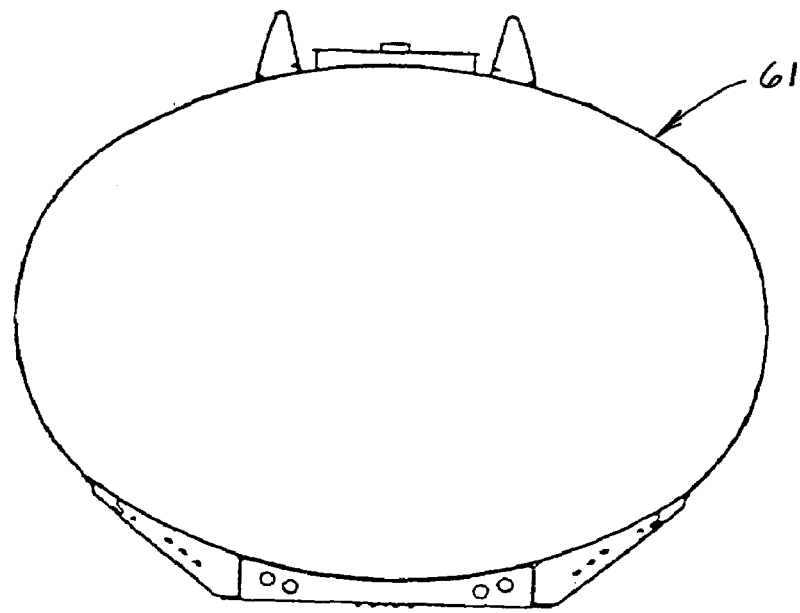
FIG. 17 is a schematic view showing a subsequent step (to that shown in FIG. 16) in a preferred method for assembling a container for a container vehicle according to the invention.
Figure 18:
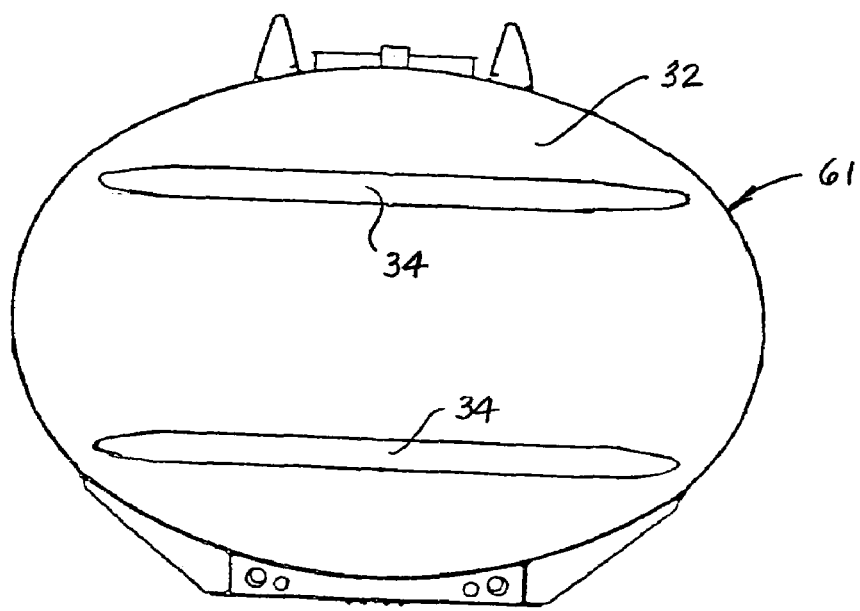
FIG. 18 is a schematic view showing a subsequent step (to that shown in FIG. 17) in a preferred method for assembling a container for a container vehicle according to the invention.
Figure 19:
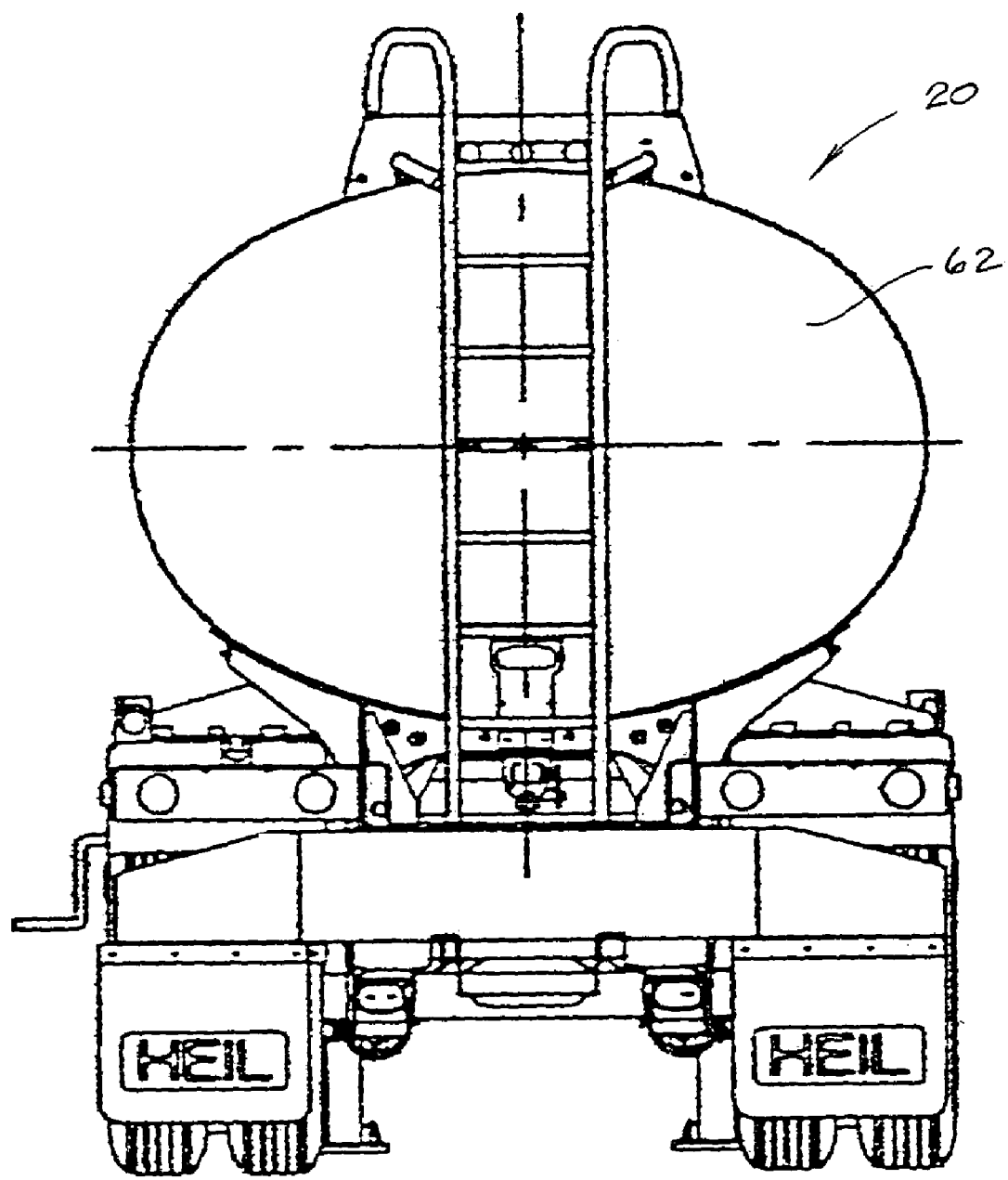
FIG. 19 is an end view of the container vehicle of FIG. 1.

As described above, it is common for the container to be fabricated in one assembly and the frame components fabricated in one or more separate assemblies. In most circumstances, the base frame and the suspension frame are separately fabricated and the two frame components are welded or bolted together prior to mounting of the container thereon. FIGS. 10 and 12-18 illustrate the steps of the preferred method for assembling a generally cylindrical container for attachment to the frame assembly of a container vehicle such as container trailer 20. According to this preferred method, four curved plates of suitable thickness and length are formed from sheets of aluminum or other suitable material. A number of such curved plates may be placed end to end to provide a component of suitable length. As best shown in FIGS. 12 and 15, bottom component 40 is provided in the form of a curved plate 40. Preferably, the bottom component is mounted onto a plurality of support brackets 46 (one of which is shown in FIG. 15). In addition, as shown in FIGS. 13 and 15, each of left side component 42 and right side component 44 are provided in the form of a curved plate such as plate 43. Left side component 42 has upper edge 48 and lower edge 50, and right side component 44 has upper edge 52 and lower edge 54. As shown in FIGS. 14 and 15, top component 56 is also provided in the form of curved plate 56. This top component may include walkway supports 58 and access hatches (one of which, hatch 60, is shown in the drawings). The bottom component, top component and side components are sized, curved and arranged so that the lower edges of the side components may be attached to the bottom component and the upper edges of the side components may be attached to the top component to form a generally cylindrical enclosure. These steps of the method are illustrated in FIGS. 12-17, and result in the formation of a generally cylindrical enclosure 61. A pair of end caps are also provided, including rear end cap 62 and front end cap 64 (shown in FIG. 1).

When bottom component 40, top component 56, left side component 42 and right side component 44 are assembled to form generally cylindrical enclosure 61, one or more bulkheads 32 are attached inside generally cylindrical enclosure 61 so that stiffening ribs 34 are horizontally oriented. Generally the bulkheads are attached by welding, and since they are non-flanged, the peripheral edge of the plate which abuts the interior surface of enclosure 61 may be welded from both sides, preferably by a robot welder. Then, end caps 62 and 64 are attached to each end of the generally cylindrical enclosure to form container 22. Of course, certain steps of this method may be performed in sequences other than as set out in connection with the preferred embodiment.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be understood by those having ordinary skill in the art to which the invention relates, and the same are intended to be comprehended within the meaning and range of equivalents of the appended claims.

What is claimed is:

1. A container trailer comprising:
   (a) a generally cylindrical elongate container;
   (b) a bulkhead mounted internally within the container, said bulkhead:
      (i) having a width;
      (ii) having a height;
      (iii) comprising a plate which does not comprise a portion of a sphere and which includes no peripheral flange, said plate having a curve of constant radius across its width;
      (iv) including a horizontally-oriented stiffening rib;
   (c) a structural frame which:
      (i) supports all or a portion of the container;
      (ii) includes a plurality of axles and a suspension system therefor.

2. The container trailer of claim 1 wherein the radius of the curve across the width of the bulkhead is within the range of 90-95% of the width of the bulkhead.

3. The container trailer of claim 1 wherein:
(a) the bulkhead is generally elliptical;
(b) the minor radius is within the range of 30-50% of the major radius.

4. The container trailer of claim 1 wherein the horizontally-oriented stiffening rib is formed in the bulkhead.

5. The container trailer of claim 4 wherein the horizontally-oriented stiffening rib has:
(a) a length;
(b) a depth;
(c) a radius at the center of its length that is within the range of 1-2 times its depth at the center of its length.

6. A container trailer comprising:
(a) a generally cylindrical elongate container;
(b) a bulkhead mounted internally within the container, said bulkhead comprising a plate which comprises a segment of a cylinder, said plate:
(i) having no peripheral flange;
(ii) including a horizontally-oriented stiffening rib;
(c) a structural frame which:
(i) supports all or a portion of the container;
(ii) includes a plurality of axles and a suspension system therefor.

7. The container trailer of claim 6 wherein:
(a) the bulkhead has a width;
(b) the bulkhead has a height;
(c) the radius of the curve of the bulkhead across its width is within the range of 90-95% of the width of the bulkhead.

8. The container trailer of claim 6 wherein:
(a) the bulkhead is generally elliptical;
(b) the minor radius is within the range of 30-50% of the major radius.

9. The container trailer of claim 6 wherein the horizontally-oriented stiffening rib is formed in the bulkhead.

10. The container trailer of claim 6 wherein the horizontally-oriented stiffening rib has:
(a) a length;
(b) a depth;
(c) a radius at the center of its length that is within the range of 1-2 times its depth at the center of its length.

11. A container trailer comprising:
(a) an elongate container;
(b) a bulkhead mounted internally within the container, said bulkhead:
(i) having a width;
(ii) having a height;
(iii) comprising a plate with no peripheral flange, said plate having a curve of constant radius across its width and no curve across its height;
(iv) including a horizontally-oriented stiffening rib;
(c) a structural frame which:
(i) supports all or a portion of the container;
(ii) includes a plurality of axles and a suspension system therefor.

12. The container trailer of claim 11 wherein the radius of the curve across the width of the bulkhead is within the range of 90-95% of the width of the bulkhead.

13. The container trailer of claim 11 wherein the horizontally-oriented stiffening rib is formed in the bulkhead.

14. The container trailer of claim 13 wherein the horizontally-oriented stiffening rib has:
(a) a length;
(b) a depth;
(c) a radius at the center of its length that is within the range of 1-2 times its depth at the center of its length.

* * * * *